US010924549B2

(12) United States Patent
Jiang

(10) Patent No.: US 10,924,549 B2
(45) **Date of Patent: *Feb. 16, 2021**

(54) METHOD AND DEVICE FOR DATA VERSION COMPARISON BETWEEN TRANS-TIME ZONE SITES

(71) Applicant: Advanced New Technologies Co., Ltd., Grand Cayman (KY)

(72) Inventor: Zhen Jiang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/945,767

(22) Filed: Jul. 31, 2020

(65) Prior Publication Data

US 2020/0366735 A1 Nov. 19, 2020

Related U.S. Application Data

(63) Continuation of application No. 16/722,310, filed on Dec. 20, 2019, which is a continuation of application (Continued)

(30) Foreign Application Priority Data

May 17, 2016 (CN) .......................... 2016 1 0326461

(51) Int. Cl.
*G06F 15/16* (2006.01)
*H04L 29/08* (2006.01)
(Continued)

(52) U.S. Cl.
CPC ........ *H04L 67/1095* (2013.01); *H04L 9/3297* (2013.01); *G06F 16/1873* (2019.01); *G06F 16/2322* (2019.01)

(58) Field of Classification Search
CPC .......................... G06F 16/1873; G06F 16/2322
See application file for complete search history.

(56) References Cited

U.S. PATENT DOCUMENTS 5,806,074 A 9/1998 Souder et al.
8,296,400 B2 * 10/2012 Gorthy ................ H04L 41/0226 709/220

(Continued)

FOREIGN PATENT DOCUMENTS

CN 101741760 6/2010
CN 101854615 10/2010

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Hieu T Hoang
(74) *Attorney, Agent, or Firm* — Fish & Richardson P.C.

(57) ABSTRACT

Techniques for providing data version comparison between trans-time zone sites. One example method includes target data and a corresponding time stamp is received from each trans-time zone site. Each of the time stamps are based on a respective time zone of a sending trans-time zone site from which the target data and the time stamp were received. Each of the received time stamps are modified based on the respective time zone of the sending trans-time zone site for the time stamp and a time zone of the central server. The received target data is compared from each of the trans-time zone sites to stored target data based on the modified corresponding time stamp. A latest version of the target data (Continued)

is stored by the central server having a modified corresponding time stamp that is greater than each of the other modified corresponding time stamps.

20 Claims, 5 Drawing Sheets

Related U.S. Application Data

No. 16/193,401, filed on Nov. 16, 2018, which is a continuation of application No. PCT/CN2017/080191, filed on Apr. 12, 2017.

(51) Int. Cl.
*H04L 9/32* (2006.01)
*G06F 16/18* (2019.01)
*G06F 16/23* (2019.01)

(56) References Cited

U.S. PATENT DOCUMENTS

| | | | | |
|---|---|---|---|---|
| 8,543,675 | B1 | 9/2013 | Yiu et al. | |
| 8,732,856 | B2 * | 5/2014 | Sack | H04L 63/105 726/30 |
| 9,621,576 | B1 | 4/2017 | Oprea et al. | |
| 2003/0037026 | A1 | 2/2003 | Bantz et al. | |
| 2003/0140050 | A1 * | 7/2003 | Li | G06F 16/50 |
| 2006/0248083 | A1 * | 11/2006 | Sack | G06F 21/6218 |
| 2008/0235810 | A1 | 9/2008 | Staring et al. | |
| 2008/0250128 | A1 | 10/2008 | Sargent | |
| 2010/0255824 | A1 | 10/2010 | Shih et al. | |
| 2012/0131185 | A1 | 5/2012 | Petersen et al. | |
| 2013/0173661 | A1 | 7/2013 | Wang | |
| 2014/0047131 | A1 | 2/2014 | Bicakci | |
| 2019/0089782 | A1 | 3/2019 | Jiang | |
| 2020/0137158 | A1 | 4/2020 | Jiang | |

FOREIGN PATENT DOCUMENTS

| | | |
|---|---|---|
| CN | 103186570 | 7/2013 |
| CN | 103226603 | 7/2013 |
| CN | 103595807 | 2/2014 |
| KR | 20050085643 | 8/2005 |
| TW | 201019144 | 5/2010 |
| TW | I1400623 | 7/2013 |
| WO | WO 2004056138 | 7/2004 |

OTHER PUBLICATIONS

European Extended Search Report in European Application No. 17798574.4, dated Mar. 29, 2019, 7 pages.

International Preliminary Report on Patentability in International Application No. PCT/CN2017/080191 dated Nov. 20, 2018; 8 pages.

International Search Report by the International Searching Authority issued in International Application No. PCT/CN2017/080191 dated Jun. 30, 2017; 8 pages.

Nakamoto, "Bitcoin: A Peer-to-Peer Electronic Cash System," www.bitcoin.org, 2005, 9 pages.

* cited by examiner

METHOD AND DEVICE FOR DATA VERSION COMPARISON BETWEEN TRANS-TIME ZONE SITES

CROSS-REFERENCE TO RELATED APPLICATIONS

This application is a continuation of and claims the benefit of priority of U.S. patent application Ser. No. 16/722,310, filed Dec. 20, 2019, which is a continuation of U.S. application Ser. No. 16/193,401, filed on Nov. 16, 2018, which is a continuation of PCT Application No. PCT/CN2017/080191, filed on Apr. 12, 2017, which claims priority to Chinese Patent Application No. 201610326461.7, filed on May 17, 2016, and each application is hereby incorporated by reference in their entirety.

TECHNICAL FIELD

The present application relates to the communications field, and in particular, to a method and device for data version comparison between trans-time zone sites.

BACKGROUND

In internationalized services, because different service sites may be respectively deployed in different countries, a central site is usually used to aggregate service data generated by international sites.

However, in an existing data aggregation solution, the service data of the international sites is usually considered to be mutually independent, and the central site usually aggregates the service data of the international sites independently without considering that trans-time zone sites can include the same data as other sites.

In such case, when the central site aggregates the same service data on the trans-time zone sites, if the service data has different versions on the trans-time zone sites, when the central site aggregates the service data in a time sequence of sending the service data to a central node, versions of the aggregated service data may be disordered, and consequently, an actual service need cannot be satisfied.

SUMMARY

The present application provides a method for data version comparison between trans-time zone sites, and the method includes the following: receiving time stamps generated when trans-time zone sites modify the same target data, and the modified target data; when the time stamps are generated by the trans-time zone sites based on respective time zones of the trans-time zone sites, separately performing, based on a time zone of a central site, time zone conversion on the time stamps submitted by the trans-time zone sites; and performing, based on time stamps obtained after the time zone conversion and submitted by the trans-time zone sites, data version comparison on the target data submitted by the trans-time zone sites, so as to determine target data of the latest version in the target data submitted by the trans-time zone sites.

Optionally, the method further includes the following: when the time stamps are generated by the trans-time zone sites based on the time zone of the central site, performing, based on the time stamps submitted by the trans-time zone sites, the data version comparison on the target data submitted by the trans-time zone sites.

Optionally, the separately performing, based on a time zone of a central site, time zone conversion on the time stamps submitted by the trans-time zone sites includes the following: querying the time zones of the trans-time zone sites; and separately performing, based on a conversion relationship between a time zone of each trans-time zone site and a time zone of a central site, the time zone conversion on the time stamps submitted by the trans-time zone sites.

Optionally, the performing, based on the time stamps submitted by the trans-time zone sites, the data version comparison on the target data submitted by the trans-time zone sites includes the following: comparing values of the time stamps submitted by the trans-time zone sites; and determining that target data submitted by a trans-time zone site with the largest time stamp value is the target data of the latest version.

Optionally, the method further includes the following: when the target data of the latest version in the target data submitted by the trans-time zone sites is determined, updating locally stored original target data by using the target data of the latest version.

The present application further provides a device for data version comparison between trans-time zone sites, and the device includes the following: a receiving module, configured to receive time stamps generated when trans-time zone sites modify the same target data, and the modified target data; a conversion module, configured to separately perform time zone conversion on the time stamps submitted by the trans-time zone sites based on a time zone of a central site, when the time stamps are generated by the trans-time zone sites based on respective time zones of the trans-time zone sites; and a comparison module, configured to perform, based on time stamps obtained after the time zone conversion and submitted by the trans-time zone sites, data version comparison on the target data submitted by the trans-time zone sites, so as to determine target data of the latest version in the target data submitted by the trans-time zone sites.

Optionally, the comparison module is further configured to perform the data version comparison on the target data submitted by the trans-time zone sites, based on the time stamps submitted by the trans-time zone sites, when the time stamps are generated by the trans-time zone sites based on the time zone of the central site.

Optionally, the conversion module is configured to query the time zones of the trans-time zone sites; and separately perform, based on a conversion relationship between a time zone of each trans-time zone site and a time zone of a central site, the time zone conversion on the time stamps submitted by the trans-time zone sites.

Optionally, the comparison module is configured to compare values of the time stamps submitted by the trans-time zone sites; and determine that target data submitted by a trans-time zone site with the largest time stamp value is the target data of the latest version.

Optionally, the device further includes the following: an update module, configured to update locally stored original target data by using the target data of the latest version, when the target data of the latest version in the target data submitted by the trans-time zone sites is determined.

In the present application, based on time stamps generated when trans-time zone sites modify the same target data and the target data after the modification, when the time stamps are generated by the trans-time zone sites based on respective time zones of the trans-time zone sites, time zone conversion is separately performed on the time stamps submitted by the trans-time zone sites based on the time zone of a central site; and data version comparison is performed on the target data submitted by the trans-time zone sites based on time stamps obtained after the time zone conversion and submitted by the trans-time zone sites, so as to determine target data of the latest version in the target data submitted by the trans-time zone sites. Therefore, when aggregating service data of the trans-time zone sites and the trans-time zone sites modify the same target data, a central node can perform, the time zone conversion on the submitted time stamps based on a time zone of the central node, so that the central node can use time stamps with a unified time zone to perform the version comparison on the modified service data submitted by the trans-time zone sites. Therefore, after the trans-time zone sites modify the same service data, the modified service data submitted by the trans-time zone sites is aggregated in a version sequence without causing disordered service data versions.

DESCRIPTION OF IMPLEMENTATIONS

Figure 1:
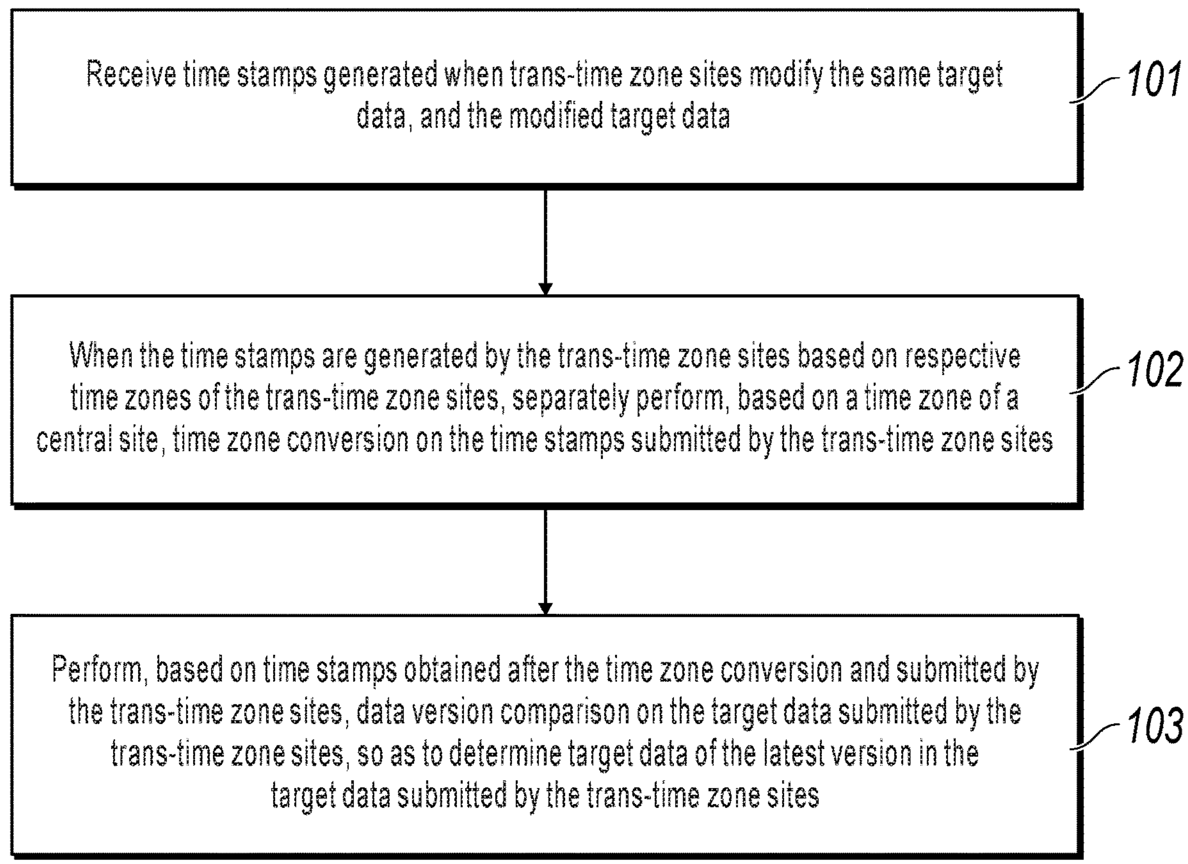
FIG. 1 is a flowchart illustrating a method for data version comparison between trans-time zone sites, according to an implementation of the present application.

In internationalized services, to implement centralized management and control on services of international sites on a central site, the central site usually needs to aggregate service data of the international sites to the central site for centralized storage.

However, in actual applications, the services of the international sites are usually independently operated, and the service data on the international sites is usually not interworked. Therefore, in such a case, a central node considers the service data of the international sites to be mutually independent, and aggregates the service data of the international sites without considering that the international sites can include the same data.

In an existing data aggregation solution, the central node usually asynchronously aggregates the service data of the international sites. For example, after modifying certain service data, the international sites can asynchronously submit the modified service data to the central node in a message form for aggregation.

However, because the central node aggregates service data of the international sites asynchronously, it can result in disordered data versions. As a result, the central node may incorrectly replace data of the latest version with data of an earlier version. For example, when the international sites submit the service data of the latest version to the central node, a packet including the service data of the earlier version may be sent to the central node after a packet including the service data of the latest version because of a network delay, etc., but the central node usually aggregates data in a sequence of sending the data to the central node. Consequently, versions of aggregated data may be disordered during data aggregation by the central node.

In the existing data aggregation solution, to prevent disordered data versions, after any international site modifies certain service data, the international site generates a time stamp based on a time zone of the international site, and then asynchronously submits the time stamp and the modified service data to the central node. When aggregating the service data of the international site, the central node can perform data version comparison based on the time stamp, determine service data of the latest version, and then complete aggregation.

However, with deepening of a service internationalization process, service interworking between the international sites is increasingly popularized, and increasingly more service operators support data sharing by different international sites. Therefore, in the existing data aggregation solution, an actual service need cannot be satisfied if the central node aggregates the service data of the international sites without considering that the international sites include the same data.

A method for data version comparison between trans-time zone sites is provided in the present disclosure. Time stamps generated when trans-time zone sites modify the same target data and the modified target data are received. When the time stamps are generated by the trans-time zone sites based on respective time zones of the trans-time zone sites, time zone conversion is separately performed on the time stamps submitted by the trans-time zone sites based on a time zone of a central site. Moreover, data version comparison is performed on the target data submitted by the trans-time zone sites based on time stamps obtained after the time zone conversion and submitted by the trans-time zone sites, so as to determine target data of the latest version in the target data submitted by the trans-time zone sites. Therefore, when aggregating service data of the trans-time zone sites, a central node can perform, based on a time zone of the central node, the time zone conversion on the time stamps submitted when the trans-time zone sites modify the same target data, so that the central node can use time stamps with a unified time zone to perform the version comparison on the modified service data submitted by the trans-time zone sites. Therefore, after the trans-time zone sites modify the same service data, the modified service data submitted by the trans-time zone sites is aggregated in a version sequence without causing disordered service data versions.

With reference to specific application scenarios, the following describes the present application by using specific implementations.

Referring to FIG. 1, FIG. 1 illustrates a method for data version comparison between trans-time zone sites, according to an implementation of the present application. The method is applied to the server of a central node, and can include the following steps.

Step 101: Receive time stamps generated when trans-time zone sites modify the same target data, and the modified target data.

The trans-time zone sites can include service sites that include the same operation service and that are located in mutually different time zones. For example, when the earlier described service is a payment service, the trans-time zone sites can include international sites deployed in different countries that are used to provide a cross-border payment service for a user, or can include service sites deployed in administrative regions with mutually different time zones in the same country that are used to provide a national payment service for a user.

The target data can be shared by servers of the trans-time zone sites, and the servers of the trans-time zone sites include service data with corresponding modification permission. A specific service data form is not limited in the present implementation.

For example, in a shown application scenario, assume that the servers of the trans-time zone sites can support the user in logging in to the trans-time zone sites based on the same login account. Therefore, the target data can be a login password corresponding to the login account, and the user can access servers of different trans-time zone sites by using the same login account, modify the login password corresponding to the login account by using the accessed servers of the trans-time zone sites, and then submit a modified login password to the server of the central node.

The time stamp is used to record a precise time for modifying the target data by the user, and can be represented by total seconds from Greenwich Mean Time 1970-01-01 00:00:00 to the time for modifying the target data by the user.

It is worthwhile to note that, in actual applications, to prevent the trans-time zone sites from submitting the same time stamp, the time stamps can be accurate to the more precise duration unit such as a millisecond.

In the present implementation, the target data usually can be modified by the user. For example, the user can log in to the servers of the trans-time zone sites by using a client terminal, to modify the target data stored on the servers of the trans-time zone sites.

The servers of the trans-time zone sites can generate the time stamps at the back end when the user modifies the target data, record the precise time for modifying the target data by the user, and after the user modifies the target data, submit the generated time stamps and the target data modified by the user to the server of the central node. The server of the central node performs version comparison for aggregation.

The servers of the trans-time zone sites can generate the time stamps based on time zones of the trans-time zone sites or based on the time zone of a central site. In actual applications, the time stamps can be generated by the trans-time zone sites through negotiation in advance. For example, in actual applications, the trans-time zone sites and the central site can negotiate, in advance through exchange of a control packet, time zones used for generating the time stamps by the trans-time zone sites.

In the present implementation, after generating the time stamps, the servers of the trans-time zone sites can obtain the target data modified by the user, and then submit the generated time stamps and the target data modified by the user to the server of the central node.

The servers of the trans-time zone sites can still asynchronously submit the time stamps and the modified target data to a server of the central site by using messages. For example, the servers of the trans-time zone sites can add the time stamps and the modified target data to a packet, and then send the packet to the server of the central node based on information such as an IP address or an interface port of the server of the central site.

Step 102: When the time stamps are generated by the trans-time zone sites based on respective time zones of the trans-time zone sites, separately perform, based on a time zone of a central site, time zone conversion on the time stamps submitted by the trans-time zone sites.

In the present implementation, when receiving the time stamps and the modified target data submitted by the servers of the trans-time zone sites, the server of the central site can perform, based on the time stamps submitted by the servers of the trans-time zone sites, version comparison on the modified target data submitted by the servers of the trans-time zone sites.

The time stamps can be generated by the trans-time zone sites based on the respective time zones of the trans-time zone sites, or based on the time zone of the central site. Therefore, for the two cases, the server of the central node can differently perform, based on the time stamps submitted by the trans-time zone sites, version comparison on the modified target data submitted by the trans-time zone sites.

In a shown implementation, if the server of the central site negotiates with the servers of the trans-time zone sites in advance to generate the time stamps by using the respective time zones of the trans-time zone sites, the server of the central site can perform, based on the time zone of the central site, the time zone conversion on the time stamps submitted by the servers of the trans-time zone sites.

When performing the time zone conversion on the time stamps submitted by the servers of the trans-time zone sites, the server of the central site can identify, based on locations of the trans-time zone sites, the time zones of the trans-time zone sites, and then perform, based on a conversion relationship between a time zone of a central site and a time zone of a trans-time zone site, the time zone conversion on the time stamps submitted by the trans-time zone sites.

For example, assume that the central site is located in Hangzhou with a time zone GMT+8, and the trans-time zone site is a Japan site with a time zone GMT+9. A conversion relationship between the time zone of the central site and the time zone of the Japan site is subtracting one hour. Assume that the Japan site generates a time stamp of N seconds based on the time zone of the Japan site, the central site can subtract 3600 seconds from the time stamp when performing the time zone conversion on the time stamp, and a time stamp obtained after the time zone conversion is N−3600 seconds.

Step 103: Perform, based on time stamps obtained after the time zone conversion and submitted by the trans-time zone sites, data version comparison on the target data submitted by the trans-time zone sites, so as to determine target data of the latest version in the target data submitted by the trans-time zone sites.

In the present implementation, after performing the time zone conversion on the time stamps submitted by the trans-time zone sites, the server of the central site can perform, based on the time stamps obtained after the time zone conversion and submitted by the trans-time zone sites, the version comparison on the modified target data submitted by the trans-time zone sites.

When performing, based on the time stamps obtained after the time zone conversion, the version comparison on the modified target data submitted by the trans-time zone sites, the server of the central site can directly compare values of the time stamps submitted by the trans-time zone sites, because time zones of the time stamps obtained after the time zone conversion and submitted by the trans-time zone sites have been unified; then determine that modified target data submitted by a trans-time zone site with the largest time stamp value is target data of the latest version.

In addition, it is worthwhile to note that, to prevent the time stamps obtained after the time zone conversion from including time stamps of the same value, in actual applications, when the servers of the trans-time zone sites generate the time stamps, the time stamps can be accurate to the more precise duration unit such as a millisecond. By using this method, the more precise time stamp duration unit indicates the lower probability of identical values after the server of the central site performs the time zone conversion on time stamps generated by different trans-time zone sites.

In a shown implementation, if the server of the central site negotiates with the servers of the trans-time zone sites in advance to generate the time stamps by using the time zone of the central site, the servers of the trans-time zone sites have unified the time zones of the time stamps in advance when respectively generating the time stamps. In such case, after receiving the time stamps and the modified target data submitted by the servers of the trans-time zone sites, the server of the central site does not need to perform the time zone conversion on the time stamps submitted by the trans-time zone sites, and instead, the server of the central site directly uses the time stamps submitted by the trans-time zone sites, to perform the version comparison on the modified target data submitted by the trans-time zone sites.

In the present implementation, when determining, through value comparison, the target data of the latest version in the modified target data submitted by the servers of the trans-time zone sites, the server of the central site can use the target data of the latest version to update original target data stored on the server of the central node, so as to ensure that the target data stored on the server of the central node is of the latest version.

The following describes the technical solution in the previous implementation in detail by using a specific application scenario.

Figure 2:
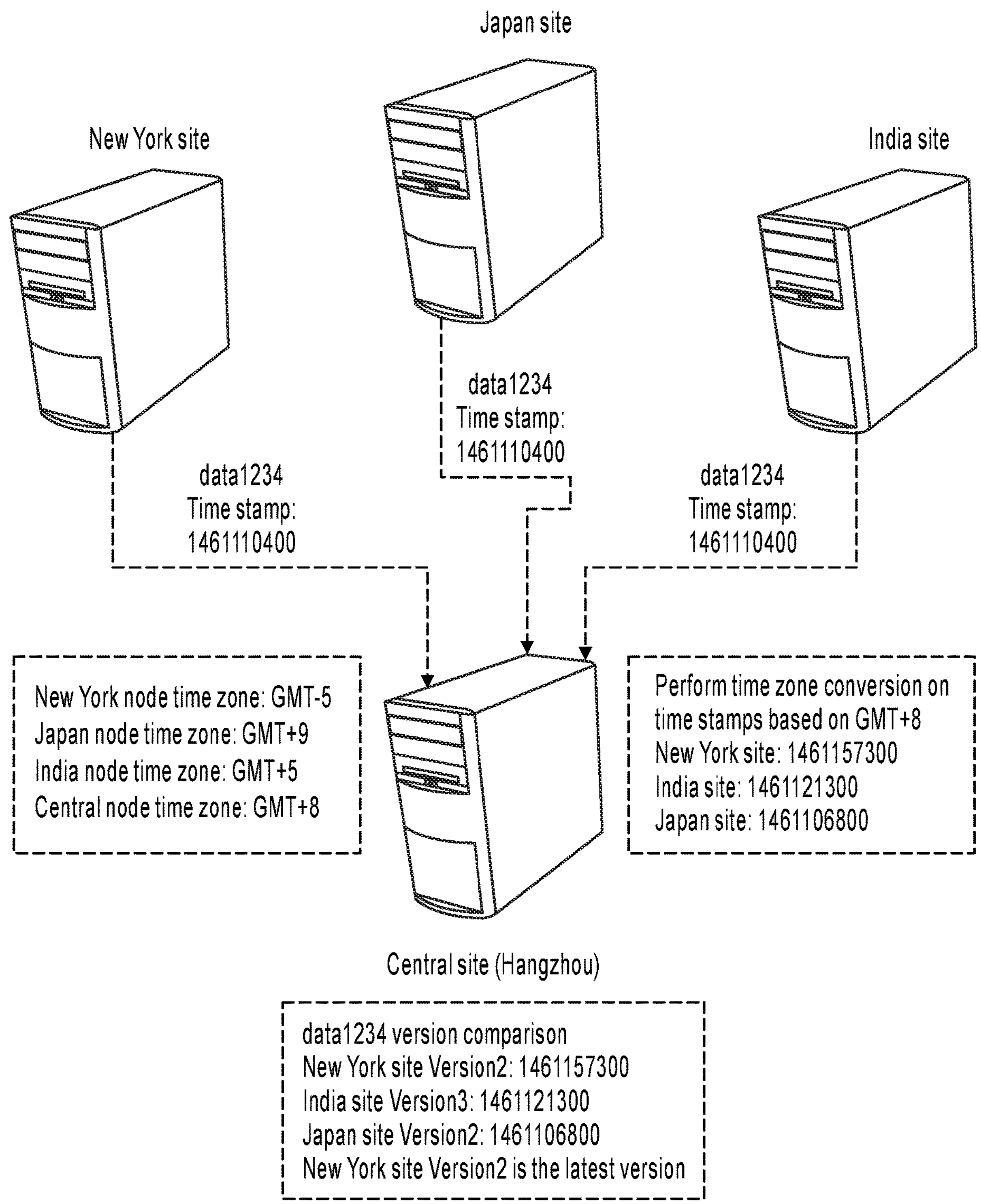
FIG. 2 is a diagram illustrating an application scenario of data version comparison between trans-time zone sites, according to an implementation of the present application.

Referring to FIG. 2, FIG. 2 is a diagram illustrating an application scenario of data version comparison between trans-time zone sites disclosed in an implementation.

In the scenario, an example in which the earlier described trans-time zone sites deploy international sites in different countries is used for description.

Assume that a server of a central site is located in Hangzhou with a time zone GMT+8.

The international sites include the following: a Japan site with a time zone GMT+9; a New York site with a time zone GMT-5; and an India site with a time zone GMT+5.

The server of the central site located in Hangzhou negotiates with servers of the Japan site, the New York site, and the India site in advance to calculate time stamps by using respective time zones of the Japan site, the New York site, and the India site.

The previous target data is data1234, and the target data is shared by the servers of the Japan site, the New York site, and the India site. In addition, the servers of the Japan site, the New York site, and the India site include service data with corresponding modification permission.

Assume that the servers of the Japan site, the New York site, and the India site modify the target data data1234 at 8:00 on Apr. 30, 3016, and the time stamps generated by the servers of the Japan site, the New York site, and the India site based on their respective time zones are 1461110400 seconds.

The servers of the Japan site, the New York site, and the India site can asynchronously submit the respectively generated time stamps and the modified target data data1234 to the server of the central site located in Hangzhou.

After receiving the respectively generated time stamps and the modified target data data1234 by the servers of the Japan site, the New York site, and the India site, the server of the central site can perform, based on the time zone of the central site, time zone conversion on the time stamps generated by the servers of the Japan site, the New York site, and the India site.

When a conversion relationship between the time zone GMT+8 of the central site and the time zone GMT+9 of the Japan site is subtracting one hour, the server of the central site can subtract 3600 seconds from the time stamp of 1461110400 seconds after performing, based on the time zone GMT+8 of the central site, the time zone conversion on the time stamp of 1461110400 seconds generated by the server of the Japan site, and a time stamp of the Japan site obtained after the time zone conversion is 1461106800 seconds.

When a conversion relationship between the time zone GMT+8 of the central site and the time zone GMT-5 of the New York site is adding 13 hours, the server of the central site can add 46800 seconds to the time stamp of 1461110400 seconds after performing, based on the time zone GMT+8 of the central site, the time zone conversion on the time stamp of 1461110400 seconds generated by the server of the New York site, and a time stamp of the New York site obtained after the time zone conversion is 1461157300 seconds.

When a conversion relationship between the time zone GMT+8 of the central site and the time zone GMT+5 of the India site is adding three hours, the server of the central site can add 10800 seconds to the time stamp of 1461110400 seconds after performing, based on the time zone GMT+8 of the central site, the time zone conversion on the time stamp of 1461110400 seconds generated by the server of the India site, and a time stamp of the India site obtained after the time zone conversion is 1461121300 seconds.

After performing, based on the time zone GMT+8 of the central site, the time zone conversion on the time stamps generated by the servers of the Japan site, the New York site, and the India site, the server of the central site can use time stamps obtained after the time zone conversion as data version numbers, and perform version comparison on the modified target data data1234 submitted by the servers of the Japan site, the New York site, and the India site.

In such case, a version number of the modified target data data1234 submitted by the Japan site is Version1=1461106800; a version number of the modified target data data1234 submitted by the New York site is Version2=1461157300; and a version number of the modified target data data1234 submitted by the India site is Version3=1461121300.

The server of the central site identifies, through comparison, that Version2>Version3>Version1. In such case, the server of the central site can determine that the modified target data data1234 submitted by the New York site is of the latest version, and can replace and update locally stored original target data data1234 by using the modified target data data1234 submitted by the New York site.

Because the server of the central site uses time stamps with a unified time zone when performing the version comparison, a version sequence of the target data submitted by the servers of the Japan site, the New York site, and the India site is consistent with a sequence of modifying the target data. Therefore, a central node aggregates, in the version sequence, the modified service data submitted by the Japan site, the New York site, and the India site without causing disordered versions.

It can be seen from the previous implementations that, in the present application, time stamps generated when trans-time zone sites modify the same target data and the modified target data are received. When the time stamps are generated by the trans-time zone sites based on respective time zones of the trans-time zone sites, time zone conversion is separately performed on the time stamps submitted by the trans-time zone sites based on a time zone of a central site. Moreover, data version comparison is performed on the target data submitted by the trans-time zone sites based on time stamps obtained after the time zone conversion and submitted by the trans-time zone sites, so as to determine target data of the latest version in the target data submitted by the trans-time zone sites. Therefore, when aggregating service data of the trans-time zone sites, a central node can perform, based on a time zone of the central node, the time zone conversion on the time stamps submitted when the trans-time zone sites modify the same target data, so that the central node can use time stamps with a unified time zone to perform the version comparison on the modified service data submitted by the trans-time zone sites. Therefore, after the trans-time zone sites modify the same service data, the modified service data submitted by the trans-time zone sites is aggregated in a version sequence without causing disordered service data versions.

Corresponding to the previous method implementation, the present application further provides a device implementation.

Figure 3:
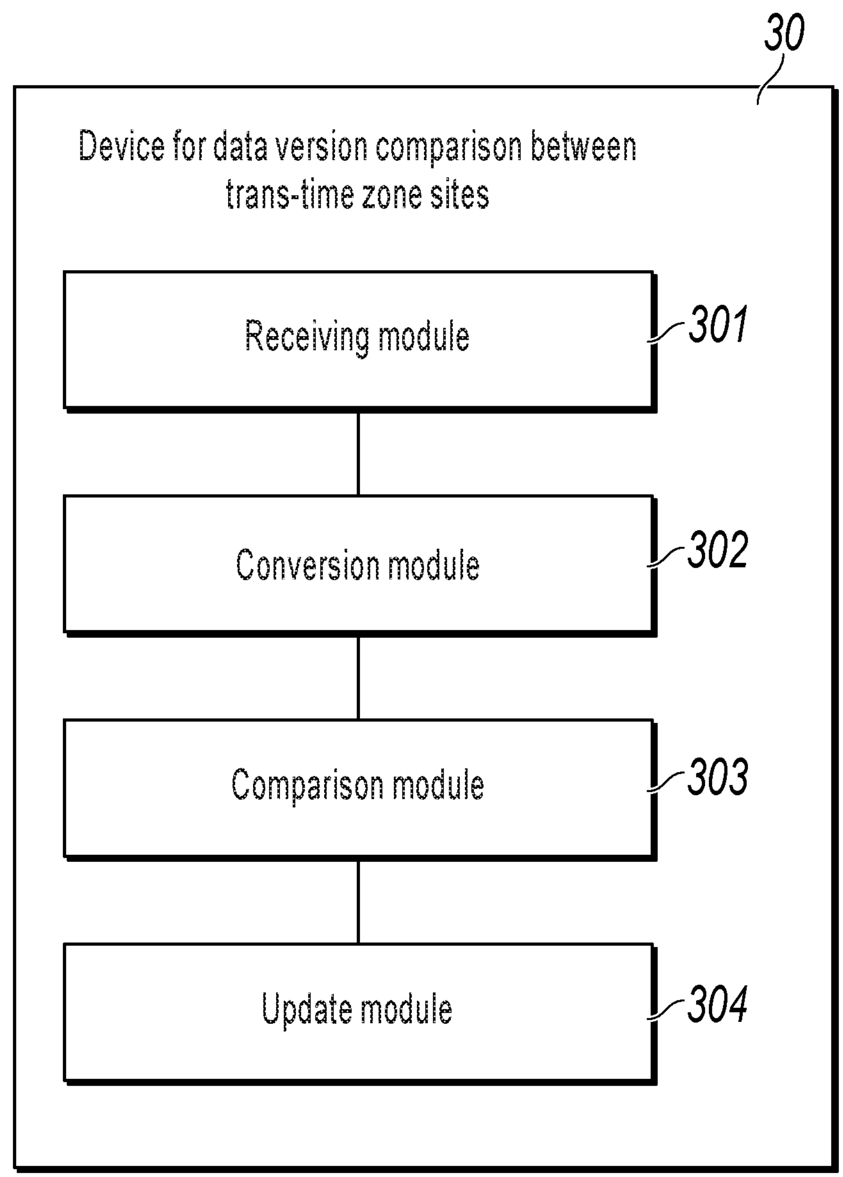
FIG. 3 is a logical block diagram illustrating a device for data version comparison between trans-time zone sites, according to an implementation of the present application.
Figure 4:
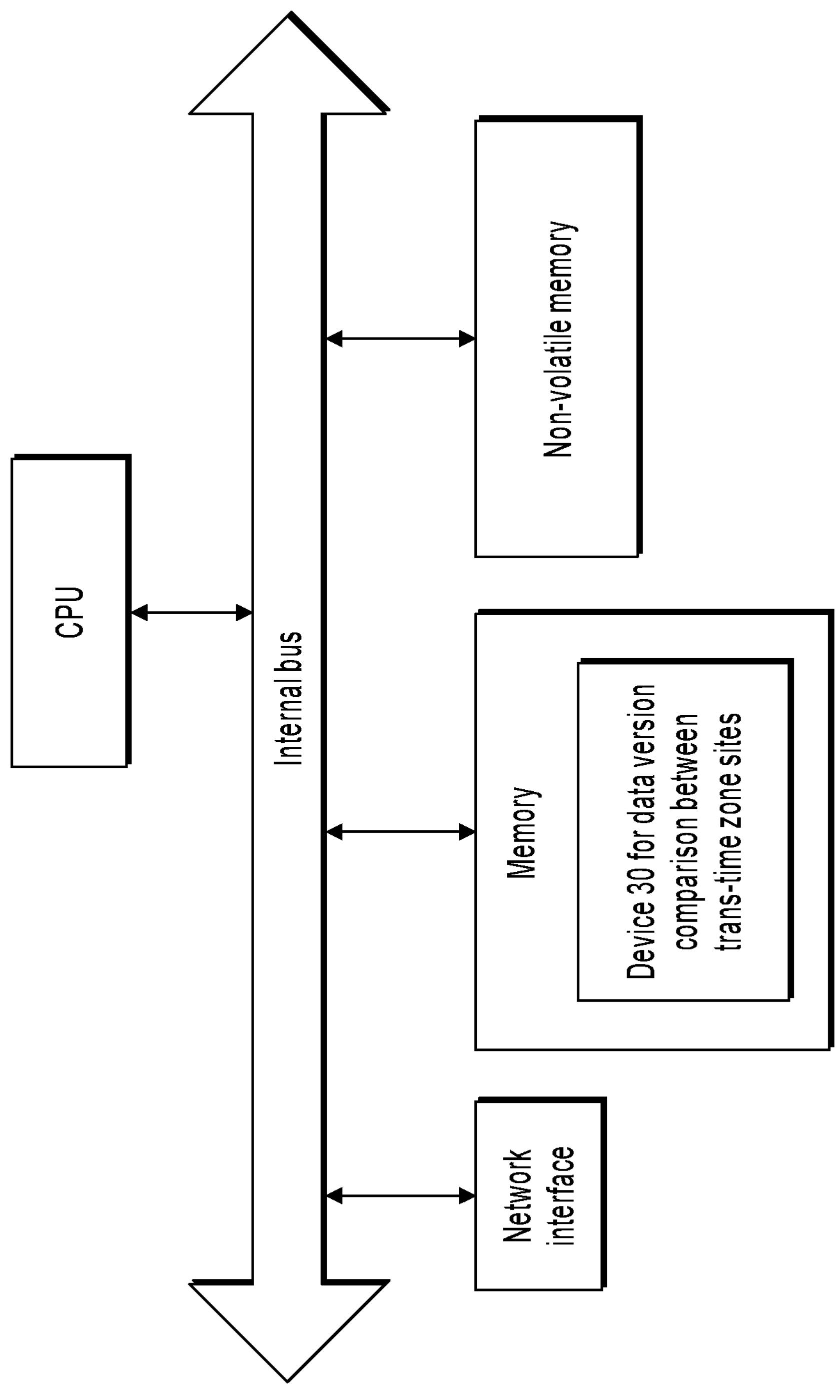
FIG. 4 is a hardware structural diagram illustrating a server including a device for data version comparison between trans-time zone sites, according to an implementation of the present application.

Referring to FIG. 3, the present application provides a device 30 for data version comparison between trans-time zone sites, and the device is applied to a server used as a central site. Referring to FIG. 4, a hardware architecture related to the server including the device 30 for data version comparison between trans-time zone sites generally includes a CPU, a memory, a nonvolatile memory, a network interface, an internal bus, etc. Software implementation is used as an example. The device 30 for data version comparison between trans-time zone sites usually can be understood as a computer program loaded in the memory. After the CPU runs the computer program, a logic device that combines software with hardware is formed. The device 30 includes: a receiving module 301, configured to receive time stamps generated when trans-time zone sites modify the same target data, and the modified target data; a conversion module 302, configured to separately perform time zone conversion on the time stamps submitted by the trans-time zone sites based on a time zone of a central site, when the time stamps are generated by the trans-time zone sites based on respective time zones of the trans-time zone sites; and a comparison module 303, configured to perform, based on time stamps obtained after the time zone conversion and submitted by the trans-time zone sites, data version comparison on the target data submitted by the trans-time zone sites, so as to determine target data of the latest version in the target data submitted by the trans-time zone sites.

In the present implementation, the comparison module 303 is further configured to perform the data version comparison on the target data submitted by the trans-time zone sites based on the time stamps submitted by the trans-time zone sites, when the time stamps are generated by the trans-time zone sites based on the time zone of the central site.

In the present implementation, the conversion module 302 is configured to query the time zones of the trans-time zone sites; and separately perform, based on a conversion relationship between a time zone of each trans-time zone site and a time zone of a central site, the time zone conversion on the time stamps submitted by the trans-time zone sites.

In the present implementation, the comparison module 303 is configured to compare values of the time stamps submitted by the trans-time zone sites; and determine that target data submitted by a trans-time zone site with the largest time stamp value is the target data of the latest version.

In the present implementation, the device 30 further includes: an update module 304, configured to update locally stored original target data by using the target data of the latest version when the target data of the latest version in the target data submitted by the trans-time zone sites is determined.

A person skilled in the art can easily figure out another implementation of the present application after considering the specification and practicing the present application. The present application is intended to cover any variations, functions, or adaptive changes of the present application. These variations, functions, or adaptive changes comply with general principles of the present application, and include common knowledge or a commonly used technical means in the technical field that is not disclosed in the present application. The specification and the implementations are merely considered as examples, and the actual scope and the spirit of the present application are described by the following claims.

It should be understood that the present application is not limited to the earlier described accurate structures that are shown in the accompanying drawings, and modifications and changes can be made without departing from the scope of the present application. The scope of the present application is limited only by the appended claims.

The previous descriptions are merely example implementations of the present application, but are not intended to limit the present application. Any modification, equivalent replacement, or improvement made without departing from the spirit and principle of the present application should fall within the protection scope of the present application.

Figure 5:
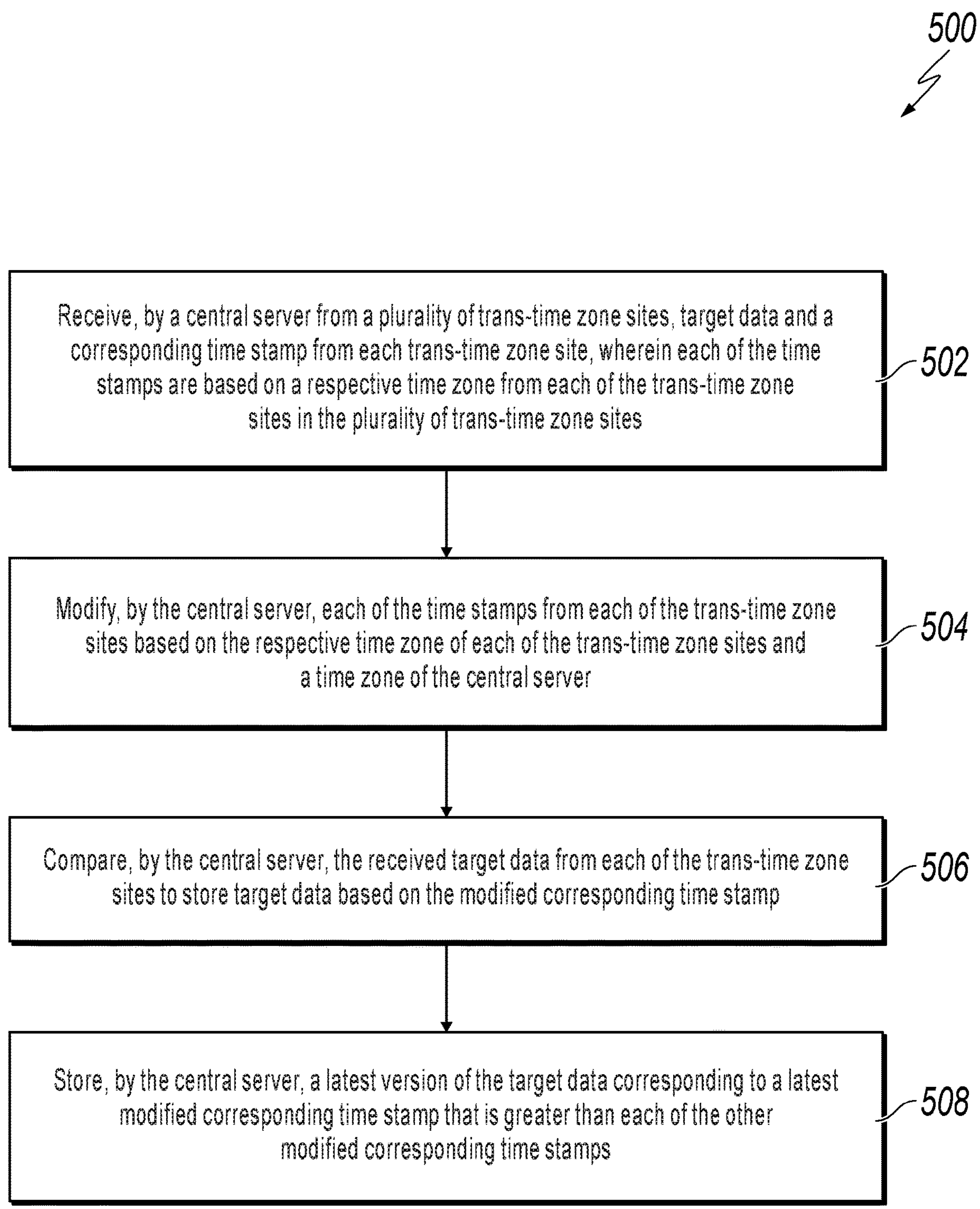
FIG. 5 is a flowchart illustrating an example of a computer-implemented method for data version comparison, according to an implementation of the present disclosure.

FIG. 5 is a flowchart illustrating an example of a computer-implemented method 500 for data version comparison, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, the central server receives from a plurality of trans-time zone sites, target data and a corresponding time stamp from each trans-time zone site, wherein each of the time stamps are based on a respective time zone from each of the trans-time zone sites in the plurality of trans-time zone sites. The center server aggregates target data from each of the trans-time zone sites for centralized processing and centralized storage.

In some implementations, the central server can asynchronously aggregate the target data from each of the trans-time zone sites. The trans-time zone sites can include service sites that perform an operation and each of the trans-time zone sites can be located in a different geographical time zone, such as different countries. For example, the trans-time zone sites can include international sites deployed in different countries that are used to provide a cross-border payment service for a user; can include service sites deployed in administrative regions with mutually different time zones in the same country that are used to provide a national payment service for a user; or, can be used for processing cellular data in various countries.

The target data can include data that is shared by one or more servers at each of the trans-time zone sites and one or more servers at the central server. For example, the servers of the trans-time zone sites can support the user logging in to a server at each of the trans-time zone sites based on a similar login account. The target data can be a login password corresponding to the login account, and a user can access a server at each of the different trans-time zone sites by using the same login account, modifying the login password corresponding to the login account by using the accessed servers of the trans-time zone sites, and then submitting a modified login password to the server of the central server. In this example, the server corresponding to the particular trans-time zone site records a time stamp for a precise time in which the user modified the target data (e.g., modified the login password). For example, this time stamp can be represented by total seconds from Greenwich Mean Time 1970-01-01 00:00:00 to the time for modifying the target data.

In some implementations, the servers of the trans-time zone sites generate time stamps based on time zones of the trans-time zone sites. In other implementations, the servers of the trans-time zone sites generate time stamps based on a time zone of the central server. In some implementations, the central server can instruct the trans-time zone sites to generate time stamps in either the time zones of the respective trans-time zone site or of the time zone of the central server. From 502, method 500 proceeds to 504.

At 504, the central server modifies each of the time stamps from each of the trans-time zone sites based on a respective time zone of each of the trans-time zone sites and a time zone of the central server. In response to the central server receiving the target data and corresponding time stamps from each of the trans-time zone sites, the central server modifies each of the time stamps based on the time zones of the trans-time zone sites and the time zone of the central server. First, the central server identifies a location of each of the trans-time zone sites. For example, a first trans-time zone site can be in Italy, a second trans-time zone site in Japan, and a third trans-time zone site in New York City. Additionally, the central server identifies its location as being in San Diego, Calif. Then, the central server modifies each of the time stamps from each of the trans-time zone sites using a conversion relationship between the time zone of the central server and the time zone of a particular trans-time zone site. Assuming that a first trans-time zone site generates a time stamp of N seconds, the central server converts the time stamp of N seconds to a time stamp in the central server time zone. From 504, method 500 proceeds to 506.

At 506, the central server compares the received target data from each of the trans-time zone sites to stored target data based on the modified corresponding time stamp. In some implementations, after the central server performs the time zone conversion on time stamps from each of the trans-time zone sites to a time zone of the central server, the central server compares values of the time stamps submitted by the trans-time zone sites to one another. In particular, after the central server converts the time stamp data from each of the trans-time zone sites, the target data and corresponding time stamp data from each of the trans-time zone sites is now unified. The central server then determines the modified target data submitted by a trans-time zone site with the largest time stamp value is the latest version of the target data for the central server. The largest time stamp value is the largest time stamp value compared between the trans-time zone sites by the central server. From 506, method 500 proceeds to 508.

At 508, the central server stores a latest version of the target data corresponding to a latest modified corresponding time stamp that is greater than each of the other modified corresponding time stamps. In response to determining the modified target data with the largest time stamp value from one of the trans-time zone site, the central server replaces stored target data with the modified target data from the trans-time zone site that provided the largest time stamp value. For example, the target data provided from the New York City trans-time zone site was deemed by the central server to include the largest time stamp value, and its corresponding target data is stored and replaces the target data previously found on the central server. After 508, method 500 stops.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:

receiving, by a central server from a plurality of trans-time zone sites, target data and a corresponding time stamp from each trans-time zone site, wherein each of the time stamps are based on a respective time zone of a sending trans-time zone site from which the target data and the time stamp were received, wherein the target data comprises account data associated with a login account shared across each of the trans-time zone sites;

modifying, by the central server, each of the received time stamps based on the respective time zone of the sending trans-time zone site for the time stamp and a time zone of the central server;

comparing, by the central server, the received target data from each of the trans-time zone sites to stored target data based on the modified corresponding time stamp; and storing, by the central server, a latest version of the target data having a modified corresponding time stamp that indicates a later time than each of the other modified corresponding time stamps.

2. The computer-implemented method of claim 1, comprising:

transmitting, by the central server, to each of the trans-time zone sites, an indication for each of the trans-time zone sites to convert the time stamp corresponding to the target data to the time zone of the central server before transmitting the target data and the corresponding time stamp to the central server.

3. The computer-implemented method of claim 1, wherein each of the trans-time zone sites is located in a different geographic region.

4. The computer-implemented method of claim 1, wherein the central server receives the target data and the corresponding time stamp from each trans-time zone site in an asynchronous manner.

5. The computer-implemented method of claim 1, wherein modifying each of the time stamps from each of the trans-time zone sites further comprises determining, by the central server, the respective time zone of each of the trans-time zone sites by identifying a physical location for each of the trans-time zone sites.

6. The computer-implemented method of claim 1, wherein the central server is located in a different geographical region from each of the trans-time zone sites.

7. The computer-implemented method of claim 1, wherein storing the latest version of the target data includes:

replacing, by the central server, the stored target data in the central server with the latest version of the target data.

8. A non-transitory, computer-readable medium storing one or more instructions executable by a computer system to perform operations comprising:

receiving, by a central server from a plurality of trans-time zone sites, target data and a corresponding time stamp from each trans-time zone site, wherein each of the time stamps are based on a respective time zone of a sending trans-time zone site from which the target data and the time stamp were received, wherein the target data comprises account data associated with a login account shared across each of the trans-time zone sites;

modifying, by the central server, each of the received time stamps based on the respective time zone of the sending trans-time zone site for the time stamp and a time zone of the central server;

comparing, by the central server, the received target data from each of the trans-time zone sites to stored target data based on the modified corresponding time stamp; and storing, by the central server, a latest version of the target data having a modified corresponding time stamp that indicates a later time than each of the other modified corresponding time stamps.

9. The non-transitory, computer-readable medium of claim 8, comprising:

transmitting, by the central server, to each of the trans-time zone sites, an indication for each of the trans-time zone sites to convert the time stamp corresponding to the target data to the time zone of the central server before transmitting the target data and the corresponding time stamp to the central server.

10. The non-transitory, computer-readable medium of claim 8, wherein each of the trans-time zone sites is located in a different geographic region.

11. The non-transitory, computer-readable medium of claim 8, wherein the central server receives the target data and the corresponding time stamp from each trans-time zone site in an asynchronous manner.

12. The non-transitory, computer-readable medium of claim 8, wherein modifying each of the time stamps from each of the trans-time zone sites further comprises determining, by the central server, the respective time zone of each of the trans-time zone sites by identifying a physical location for each of the trans-time zone sites.

13. The non-transitory, computer-readable medium of claim 8, wherein the central server is located in a different geographical region from each of the trans-time zone sites.

14. The non-transitory, computer-readable medium of claim 8, wherein storing the latest version of the target data includes:

replacing, by the central server, the stored target data in the central server with the latest version of the target data.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a central server from a plurality of trans-time zone sites, target data and a corresponding time stamp from each trans-time zone site, wherein each of the time stamps are based on a respective time zone of a sending trans-time zone site from which the target data and the time stamp were received, wherein the target data comprises account data associated with a login account shared across each of the trans-time zone sites;

modifying, by the central server, each of the received time stamps based on the respective time zone of the sending trans-time zone site for the time stamp and a time zone of the central server;

comparing, by the central server, the received target data from each of the trans-time zone sites to stored target data based on the modified corresponding time stamp; and storing, by the central server, a latest version of the target data having a modified corresponding time stamp that indicates a later time than each of the other modified corresponding time stamps.

16. The computer-implemented system of claim 15, comprising:

transmitting, by the central server, to each of the trans-time zone sites, an indication for each of the trans-time zone sites to convert the time stamp corresponding to the target data to the time zone of the central server before transmitting the target data and the corresponding time stamp to the central server.

17. The computer-implemented system of claim 15, wherein each of the trans-time zone sites is located in a different geographic region.

18. The computer-implemented system of claim 15, wherein the central server receives the target data and the corresponding time stamp from each trans-time zone site in an asynchronous manner.

19. The computer-implemented system of claim 15, wherein modifying each of the time stamps from each of the trans-time zone sites further comprises determining, by the central server, the respective time zone of each of the trans-time zone sites by identifying a physical location for each of the trans-time zone sites.

20. The computer-implemented system of claim 15, wherein storing the latest version of the target data includes:

replacing, by the central server, the stored target data in the central server with the latest version of the target data.

* * * * *